US006392189B1

(12) United States Patent
Delcea

(10) Patent No.: US 6,392,189 B1
(45) Date of Patent: May 21, 2002

(54) AXIAL FEEDSTOCK INJECTOR FOR THERMAL SPRAY TORCHES

(76) Inventor: Lucian Bogdan Delcea, c/o Duran Technologies Inc., 2078 Shaughnessy Street, Port Coquitlam, British Columbia (CA), V3C 3C5

(*) Notice: Subject to any disclaimer, the term of this patent is extended or adjusted under 35 U.S.C. 154(b) by 0 days.

(21) Appl. No.: 09/768,143

(22) Filed: Jan. 24, 2001

(51) Int. Cl.[7] .................................... B23K 10/00

(52) U.S. Cl. .............................. 219/121.5; 219/121.47; 219/76.16; 219/121.51; 239/79

(58) Field of Search ......................... 219/121.5, 121.47, 219/121.48, 76.16, 76.15, 121.36, 75; 313/231.41, 231.51; 315/111.21; 239/79, 424

(56) References Cited

U.S. PATENT DOCUMENTS 3,140,380 A 7/1964 Jensen
3,312,566 A 4/1967 Winzeler et al.
4,416,421 A 11/1983 Browning
4,540,121 A 9/1985 Browning
4,780,591 A 10/1988 Bernecki et al.
5,008,511 A 4/1991 Ross
5,225,652 A 7/1993 Landes
5,332,885 A 7/1994 Landes
5,420,391 A 5/1995 Delcea
5,556,558 A 9/1996 Ross et al.
5,837,959 A 11/1998 Muehlberger et al.
6,114,649 A 9/2000 Delcea

*Primary Examiner*—Mark Paschall
(74) *Attorney, Agent, or Firm*—Bull, Housser & Tupper

(57) ABSTRACT

A feedstock injector for connection to a source of heated gas comprises a first plurality of channels arranged symmetrically about a longitudinal axis, the channels leading from the upstream end to an intermediate region of the injector. A second plurality of channels, coaxial with the first plurality of channels and arranged symmetrically about the same longitudinal axis, extend from the outlet ends of the first plurality of channels towards the downstream end of the injector and converge at a convergence angle towards a common region of convergence located downstream on the longitudinal axis. Feedstock material is injected axially towards the common region of convergence.

23 Claims, 3 Drawing Sheets

AXIAL FEEDSTOCK INJECTOR FOR THERMAL SPRAY TORCHES

FIELD OF THE INVENTION

This invention relates to a feedstock injector for receiving a stream of heated gas, and for injecting feedstock material axially into the downstream flow of the heated gas.

BACKGROUND OF THE INVENTION

Thermal spraying is a coating method wherein powder or other feedstock material is fed into a stream of heated gas produced by a plasmatron or by the combustion of fuel gasses. The feedstock is entrapped by the hot gas stream from which it receives heat and momentum and it is further impacted onto a surface where it adheres and solidifies, forming a relatively thick thermally sprayed coating by the cladding of subsequent thin layers or lamellae.

It has been recognized for some time that, in the case of some thermal spray applications, injecting feedstock axially into a heated gas stream presents certain advantages over traditional methods wherein feedstock is fed into the stream in a direction generally described as radial injection, in other words in a direction more or less perpendicular to the direction of travel of the stream. Such advantages of the axial injection relate mainly to the potential to control better the linearity and the direction of feedstock particle trajectory. It would be therefore desirable to inject feedstock in a manner that induces an optimal particle trajectory in the axial direction.

Plasma torches with axial injection of feedstock can be classified in two major groups: a) those with multiple cathodes, also known as the pluri-plasmatron or the multiple-jet type; and b) those with a single cathode, also known as the single stream type.

Examples of multiple cathode plasma torches with axial injection are found in U.S. Pat. No. 3,140,380 of Jensen, U.S. Pat. No. 3,312,566 of Winzeler et al., U.S. Pat. No. 5,008,511 of Ross and U.S. Pat. No. 5,556,558 of Ross et al. They show a plurality of plasmatrons symmetrically arranged about the axis of the plasma spray torch and provide for nozzle means to converge the plurality of plasmas into a single plasma stream. Feeding means are also provided to inject feedstock materials along the axis of the single plasma stream. Although such plasma torches can produce satisfactory coatings, they involve complex torch configurations as well as the use of multiple power supplies for powering the multiple cathodes. The use of multiple cathodes and multiple arc chambers, which need to be replaced regularly, induce high operating costs for such plasma torches. A different approach to achieve axial injection employing multiple cathodes and a complex single arc chamber configuration is found in U.S. Pat. No. 5,225,652 and U.S. Pat. No. 5,332,885, both issued to Landes.

The single cathode type plasma torches with axial injection have certain advantages such as less complex torch configuration, less operating costs and less manufacturing costs for the plasma system. It has been recognized for some time that the introduction of powder axially through a central hole in the cathode tip is not an efficient solution for axial injection. Such an approach is found in U.S. Pat. No. 5,225,652 of Landes. The powder interferes with the electric arc, readily resulting in the malfunctioning of the torch. Other arrangements for the single cathode approach are found in U.S. Pat. No. 4,540,121 of Browning, U.S. Pat. No. 4,780,591 of Bernecki et al., U.S. Pat. No. 5,420,391 of Delcea and U.S. Pat. No. 5,837,959 of Muehlberger et al.

For example, Muehlberger et al. teach an output plasma nozzle oriented at an acute angle with respect to the torch axis. A powder feed tube axial with the output nozzle opens at or about the bent in the plasma path or alternatively penetrates into the nozzle and the plasma stream. Both alternatives proposed by Muehlberger induce a non-uniform interaction between the plasma stream and the powder due to bending of the stream and the introduction of an angled tube in the path of the stream. The plasma stream has a lower density and velocity along the wall of the far side bent, which affects the trajectory of the powder. Bernecki et al. teaches semi-splitting of the plasma stream by means of an arm which protrudes radially into the plasma stream and connects to a core member positioned axially within the plasma torch nozzle. The feedstock is injected axially through the core member. This approach creates an asymmetrical plasma stream at the point of powder injection, with a portion of the plasma stream going undisturbed about the injector, while the rest of the stream is split by the arm before the injection point.

U.S. Pat. No. 5,420,391 of Delcea teaches single step splitting of a plasma stream and, similar to Bernecki, the feedstock is injected axially through a core member. The plasma is split only once at the upstream end of the splitting channels. This approach has practical disadvantage with respect to the ability to efficiently converge and accelerate discrete plasma streams about the injection tip. If more than two splitting arms are provided in Delcea '391 in an attempt to more uniformly distribute the streams about the injection point and to achieve an acceleration of the split gas streams, the thermal efficiency of the torch would be impaired due to the full exposure of the arms to the flow of hot gas. One of the disadvantages common to the designs found in Bernecki '591 and Delcea '391 is related to the short length of the feedstock input passage running axially through the respective cores. When using reasonable carrier gas flows, the carrier gas and the powder are bent at 90° and cannot be accelerated sufficiently along the short feedstock passage in order to be efficiently projected axially into the plasma stream without being affected by turbulence. If higher carrier gas flows are used to more efficiently push the powder axially, the injection of the carrier gas will cool the plasma to the detriment of torch efficiency. On the other hand, if the feedstock input passage is extended, the elongated core and the corresponding interconnecting arms, but in particular the downstream portion of the core become exposed excessively to the hot plasma, with deleterious effects on the core and on the thermal efficiency of the torch. Further, if the core is elongated in Delcea '391, the angle of convergence shifts further downstream relative to the feedstock injector point thereby resulting in inefficient axial injection.

U.S. Pat. No. 4,540,121 of Browning discloses a plasma torch, which splits the plasma stream into a first plurality of streams and then further splits each of the first plurality of streams into a second plurality of streams while at the same time bending the streams at 90 degrees. By the very nature of this design, the second splitting occurs in an asymmetrical and non-coaxial manner. The inlets of the second splitting channels open into the side wall of each first splitting channel thereby receiving unequal gas flows i.e. due to the gradient in gas velocity and pressure, i.e. the upstream located channels receive more gas flow than the further downstream located channels. This results in an unbalanced, asymmetrical flow convergence about the feedstock injection duct thereby inducing non-axial trajectories for the feedstock particles. Further, the Browning torch has a complex configuration. Consequently, the torch will have a low thermal efficiency due to excessive exposure of the internal walls and pathways to the hot plasma gas and due to the multiple turbulent disruptions of the plasma stream induced by the combination of multiple splitting and bending of the streams.

With respect to combustion spray torches, in a majority of cases the powder is injected radially at the inlet of an elongated output nozzle. In U.S. Pat. No. 4,416,421 of Browning, the powder is injected axially in a flame-spray apparatus similar to the plasma torch described by Browning in U.S. Pat. No. 4,540,121. Therefore, the feedstock injection method described by Browning in Patent '421 presents the same disadvantages as described above with reference to the Browning Patent '121.

In the case of thermal spray torches, it is well known practice to attach an output spray nozzle in order to increase feedstock velocity and the transfer of heat to the feedstock. As a general rule, the longer the output nozzle the more velocity is transferred from the gas stream to the feedstock and therefore denser thermal spray coatings can be obtained. One of the main factors that limit the size of the output nozzle is the trajectory of the molten feedstock along the nozzle passage. If the injection of the feedstock is such that at least some feedstock deviates towards the internal wall of the nozzle, it will solidify and build up on the cold surface of the wall resulting in a malfunctioning of the spray process.

Accordingly, it would be desirable to provide a superior feedstock injector for attachement to a single stream thermal spray torch, the injector providing for optimal interaction between the feedstock and the gas stream and between the gas stream and the internal pathways of the injector.

BRIEF SUMMARY OF THE INVENTION

In one embodiment of the invention a feedstock injector having a longitudinal axis includes a first plurality of channels each having an upstream end and a downstream end, the first plurality of channels extending from the upstream end to an intermediate region of the injector, the fist plurality of channels disposed symmetrically about the longitudinal axis of the injector and shaped at their inlet ends to receive a stream of gas and to split the stream into a fist plurality of streams, each first plurality of channels having an outer wall and an inner wall, the plurality of inner walls substantially defining a first core segment therebetween. The injector also includes a second plurality of channels each having an upstream end and a downstream end, the second plurality of channels extending from the intermediate region towards the downstream end of the injector, the second plurality of channels disposed symmetrically about the longitudinal axis and comprising at least two channels for each channel of the first plurality of channels, the upstream ends of the second plurality of channels connected to the downstream ends of the first plurality of channels and shaped to receive the streams of gas flowing through the first plurality of channels and to split the streams into a second plurality of streams, each channel of the second plurality of channels having an outer wall and an inner wall, the plurality of inner walls substantially defining a second core segment therebetween. The injector further includes a feedstock input passage opening at the downstream end of the second core segment and oriented to direct feedstock axially in the downstream direction.

BRIEF DESCRIPTION OF THE DRAWINGS

Further features and advantages will be evident from the following detailed description of the preferred embodiments of the present invention and in conjunction with the accompanying drawings, in which.

DETAILED DESCRIPTION

Figure 1:
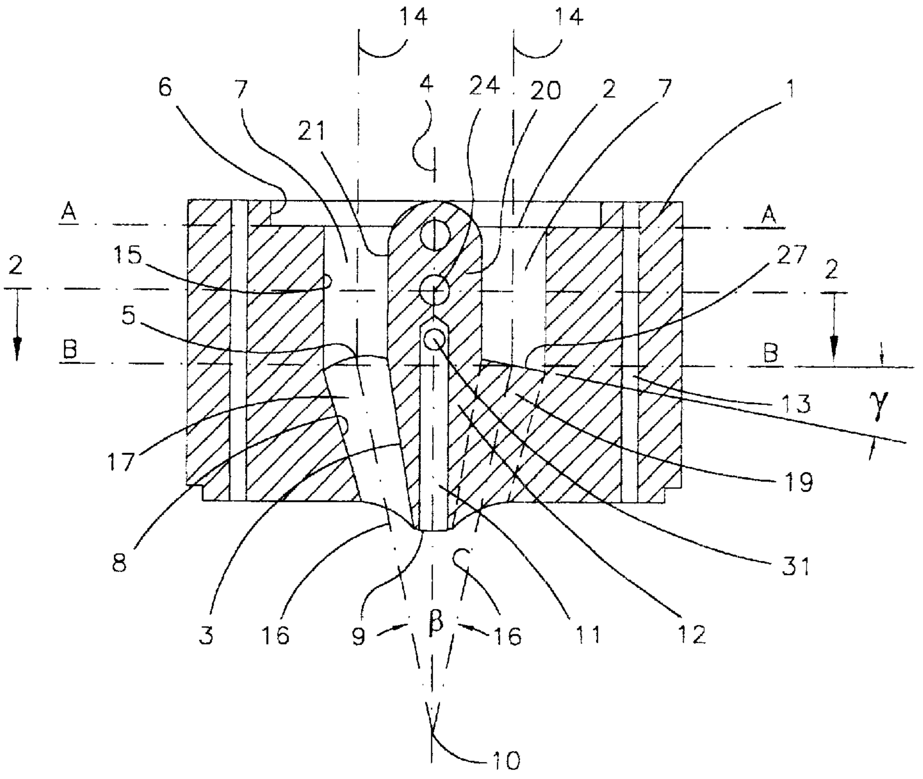
FIG. 1 is a schematic front elevation view of the feedstock injector of the present invention taken in cross-section along line 1—1 in FIG. 2.
Figure 2:
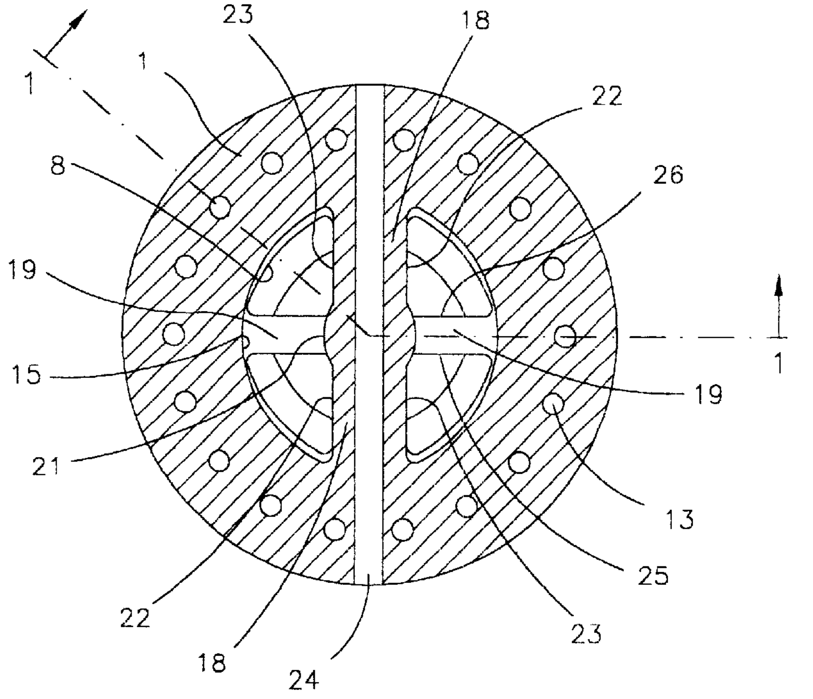
FIG. 2 is a plan view of a cross-section taken along line 2—2 in FIG. 1.

Referring initially to FIG. 1 and FIG. 2 of the drawings, the feedstock injector is shown having a body 1 and a longitudinal axis 4. Passages 13 are shown provided in body 1 for passing a cooling agent. Any other conventional means of cooling the feedstock injector may be also employed such as longitudinal outside grooves or indirect type, contact cooling. A suitable cavity 6 may be shaped at the upstream end of the injector in order to facilitate the connection to the output of a plasma generator such as a plasmatron or to other sources of heated gas such as a fuel combustion chamber. One preferred plasmatron is disclosed in U.S. Pat. No. 6,114,649 of Delcea that provides for a stabilized electric arc and the generation of a consistent and higher ionized plasma stream. A first core segment 20 extends axially from the upstream end to an intermediate region 5 of body 1. A second core segment 12 extends axially from the intermediate region 5 to the downstream end of body 1 and preferably ends with an apex or tip 9. A first plurality of splitting channels 7, are arranged symmetrically in an encircling relationship about axis 4, leading from the upstream end of body 1 towards the intermediate region 5. Channels 7 are of essentially identical shape and substantially surround the first core segment 20. Each of channels 7 comprises outer and inner path defining surfaces or walls 15 and 21 respectively. The plurality of inner walls 21 substantially encircles and defines the first core segment 20. Each pair of walls 15 and 21 is closed at each end by opposed channel walls 22 and 23 as best seen in FIG. 2 of the drawings. The plurality pairs of opposed channel walls 22 and 23 define a first plurality of gas stream splitting arms 18 extending radially from the outer wall 15 to the first core segment 20 and extend longitudinally from the upstream end to the intermediate region 5 of body 1. Preferably, opposing walls 22 and 23 converge towards each other in the downstream direction in order to improve the streamlined splitting effect of arms 18. Each channel 7 has a longitudinal axis 14. Axes 14 are shown in FIG. 1 being substantially parallel with outer walls 15 and parallel with the longitudinal axis 4. The inlet ends 2 of the first plurality of channels 7 are in coplanar alignment in a first plurality upstream plane A—A and are shaped to receive a stream of gas and to split the stream into a fist plurality of streams. Plane A—A is shown substantially perpendicular to the longitudinal axis 4. A first plurality of two splitting channels 7 is shown in FIG. 1. It is not essential that channels 7 always have a semi-circular or curved shape as illustrated in the drawings, they may have any other suitable shape e.g. crescent, oval or round.

Figure 4:
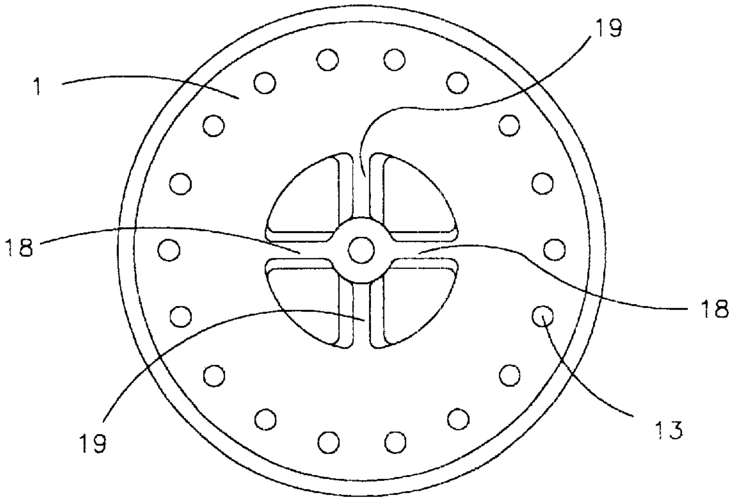
FIG. 4 is a downstream plan view of the feedstock injector in FIG.3.
Figure 5:
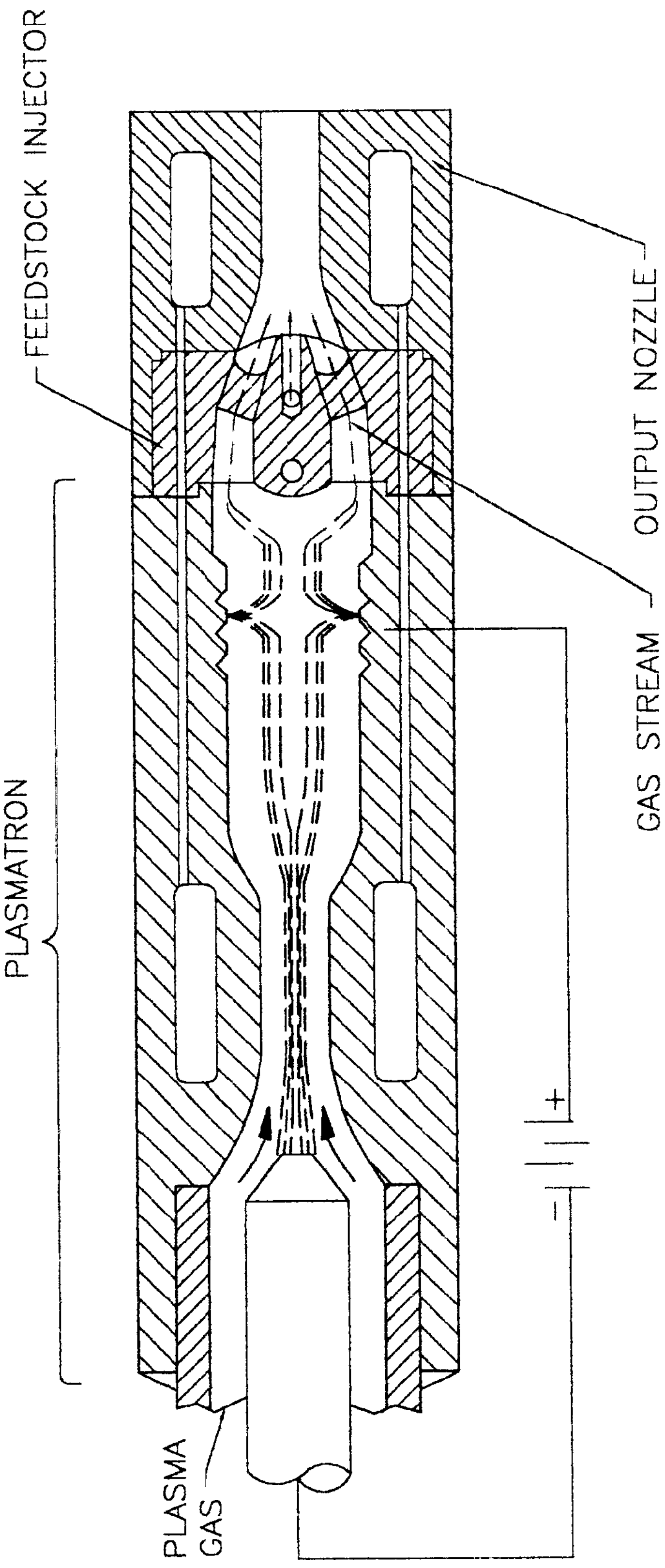
FIG. 5 is a schematic showing an instance of the feedstock injector of the present invention being incorporated in a plasma spray torch apparatus.

A second plurality of splitting channels 17, coaxial with the first plurality of channels 7, are arranged symmetrically in an encircling relationship about the same longitudinal axis 4. At least two channels 17 extend from the downstream end of each channel 7 towards the downstream end of body 1. Preferably, the perimeter of the downstream end of each channel 7 circumscribes the inlet ends of the corresponding channels 17. Channels 17 are of essentially identical shape. Each channel 17 comprises inner and outer path defining surfaces or walls 3 and 8 respectively. The plurality of inner walls 3, substantially surround and define the second core segment 12. Each pair of channels of the second plurality of channels 17 are separated by opposed channel walls 25 and 26 defining a second plurality of splitting arms 19 therebetween. Arms 19 extend radially from the outer walls 8 of channels 17 to the second core segment 12 and extend longitudinally from the outlet ends of channels 7 towards the downstream end of body 1. Each channel 17 has a longitudinal axis 16. Axes 16 and the second plurality of channels 17 converge at a convergence angle "β/2" towards a common region of convergence generally shown at numeral 10 and located on axis 4 downstream of tip or apex 9. Preferably, angle "β/2" is between 5 and 30 degrees. The inlet ends 27 of the second plurality of channels 17 are in coplanar alignment in a second plurality plane B—B and are shaped to receive the streams flowing through the first plurality of channels 7 and to split the streams into a second plurality of streams. Opposing walls 25 and 26 may converge towards each other in the downstream direction or may be shaped in any other suitable fashion in order to improve the streamlined splitting effect of arms 19 and to achieve a smooth acceleration and merging of the second plurality of streams about apex 9. To more efficiently split, re-direct and focus the streams in a converging relationship about apex 9, inlets 27 of channels 17 may be oriented at an acute angle "γ" with respect to plane B—B, preferably angle "γ" being between 5 and 30 degrees. The second plurality plane B—B is shown substantially parallel with the first plurality upstream plane A—A. FIG. 2 and FIG. 4 show an instance of the present feedstock injector comprising a first plurality of two splitting channels 7 and a second plurality of four splitting channels 17, i.e. two channels 17 for each channel 7. It is not essential that channels 17 always have a semi-circular or curved shape as illustrated in the drawings, they may have any other suitable shape e.g. crescent, oval or round.

The cooling of the first core segment is achieved by heat conduction through the first plurality of splitting arms 18. The cooling of the second core segment is achieved mainly by heat conduction through the second plurality of splitting arms 19. If increased cooling of the core segments is desired, additional cooling provisions may be provided in any suitable fashion. In FIG. 1 and in FIG. 3 for example, one or more cooling channels 24 are shown passing through an opposite pair of arms 18 and across the first core segment 20. If desired, additional cooling passages may be provided in a similar fashion passing through opposite pairs of arms 19 and across the second core segment 12.

Figure 3:
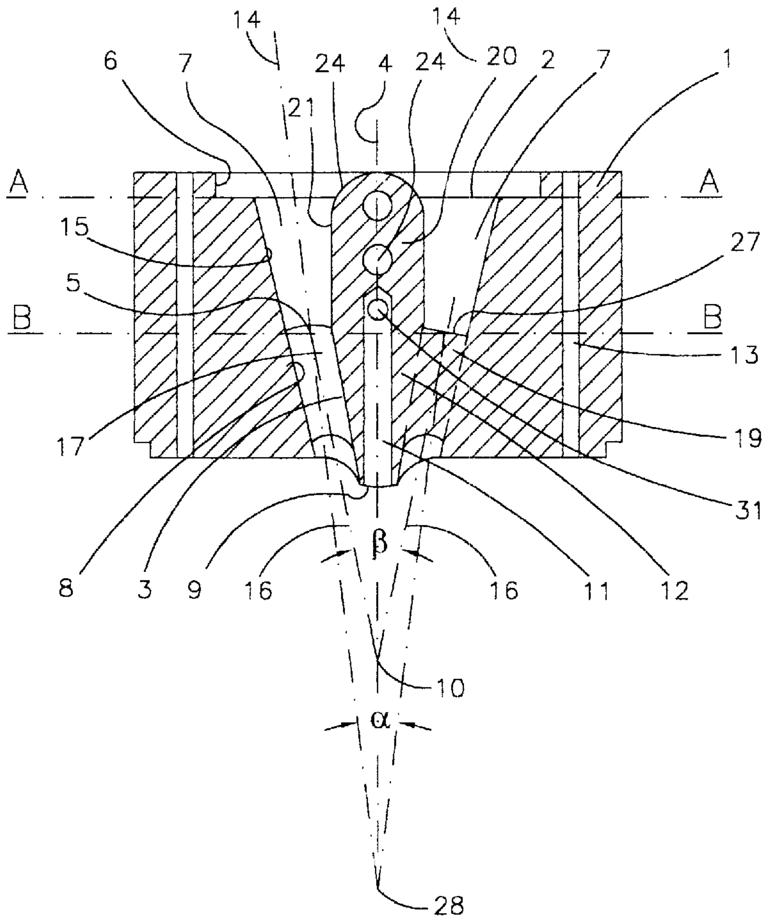
FIG. 3 is a schematic front elevation view of the feedstock injector of the present invention taken in cross-section showing alternate embodiments of the first and the second plurality of splitting channels.

Referring again to FIG. 3 of the drawings, an alternate embodiment of the first plurality of splitting channels 7 is shown. The numerical references in FIG. 3 are the same as the corresponding numerical references in FIG. 1 except as may be modified in this paragraph. Channels 7 are shown now having convergent outer path defining surfaces or walls 15. The longitudinal axes 14 of channels 7 are also shown converging towards each other into a region of convergence 28 located on axis 4 downstream of the region of convergence 10 and therefore further away from tip or apex 9. The angle of convergence of axes 14 is "α/2" and is shown being smaller than the convergence angle "β/2" of the second plurality of splitting channels 17. This design is particularly useful when a less turbulent first splitting is desired followed by a second splitting, and re-convergence of the streams at more focused converging angle.

The functioning principle of the feedstock injector will now be described with reference to FIG. 1 through FIG. 4 of the drawings. A source of hot gas such as a plasmatron or a fuel combustion chamber can be connected to the upstream surface of injector 1, for example by means of cavity 6. The heated gas stream discharged by the plasmatron or by the fuel combustion chamber is split by the first plurality of splitting arms 18 into a first plurality of streams flowing along the first plurality of splitting channels 7. Each of the first plurality of streams flowing through channels 7 is subsequently split by splitting arms 19 into a second plurality of streams flowing along a second plurality of channels 17. Since channels 17 have their axes 14 oriented at an acute angle towards axis 4, the first plurality of streams discharged by channels 7 are thereby converged and focused by the second plurality of channels 17 towards a common region of convergence generally marked at numeral 10. In FIG. 3 the region of convergence 10 is located axially between apex 9 and the virtual region of convergence 28 of the first plurality of channels 7. Feedstock material from an external source (not shown) is carried by means of a feedstock carrier gas through at least one feedstock supply passage 31 which passes through an arm 18 or 19 and opens into the feedstock injection passage 11. Upon being discharged in passage 11, the feedstock is propelled and accelerated forward along passage 11 and is subsequently injected axially through apex 9, towards the region of convergence 10.

The use of the coaxial splitting mechanism provided by the combination of cascaded splitting arms 18 and 19 allows for an improved discrete acceleration and convergence of the split streams and the definition of a second core segment 12 comprising an extended axial feedstock injection passage 11 therein. These combined features improve substantially the axial injection effect, with minimal inducement of flow turbulence and minimal heat losses from the gas streams. The plurality of second splitting arms 19 connect only the second core segment to the cooler outer walls of channels 17, efficiently cooling the lower core segment while also more efficiently directing, focusing and converging the second plurality of streams about the second core segment 12 and about apex 9.

One example of practical use of the present invention is shown schematically in FIG. wherein the present feedstock injector is shown incorporated schematically into a plasma spray torch apparatus. A plasma generator, such as a plasmatron is attached at the upstream end of the feedstock injector. A preferred plasmatron that can be used with the present feedstock injector is disclosed in U.S. Pat. No. 6,114,649 of Delcea, which provides for a stabilized electric arc operation and the issuance of a higher ionized and higher enthalpy plasma stream. Generally speaking, a plasma gas flowing through the plasmatron arc chamber is heated into a plasma stream by the electric arc struck between the cathode and the anode. The plasma stream is discharged by the plasmatron into the upstream end of the feedstock injector and is split by the injector into a first plurality of gas streams. At an intermediate region within the injector, the first plurality of streams is split again into a second plurality of streams coaxial with the first plurality of streams and directed to converge towards each other into a common region of convergence. Feedstock such as a powder is injected through a feedstock injection passage axially towards the region of convergence. An output nozzle is shown schematically attached to the downstream end of the feedstock injector. The output nozzle has its inlet shaped to receive the second plurality of gas streams and the feedstock. Consequently, the feedstock mixes with the gas streams and travels substantially axially along the bore of the output nozzle. By using the feedstock injector of the present invention, the feedstock axial velocity, axial trajectory and the mixing of the feedstock with the gas streams are highly improved, resulting in improved functioning of the thermal spraying torch and the production of improved thermal spray coatings. It was found by the applicant, without having yet a complete scientific explanation, that if the streams are split only once into a plurality of streams which are then converged about apex 9 only by the orientation of the outer or inner walls of the splitting channels, a certain flow turbulence is induced around the injection point, sufficient to disturb deleteriously the axial flow of the feedstock along the output nozzle passage. Consequently, after a certain spray time, some feedstock adhered to the internal wall of the output nozzle and the spray process had to be interrupted. By contrast, when using the present feedstock injector with its second coaxial splitting and re-convergence of the streams while under same plasma parameters and conditions, the applicant observed a more focused beam of molted feedstock material exiting the output nozzle and traveling longer and faster in a substantially axial direction. No feedstock adhered deleteriously to the output nozzle passage during some extended operation of the spray torch. Consequently, longer axial trajectories and higher velocity were obtained for the molten particles, therefore improving the plasma spray deposit and target efficiency and the plasma spray coating density and uniformity. For example, in one set of experiments using the present feedstock injector, it was remarkably possible to converge and focus the plasma stream with the entrained feedstock and to achieve a spray footprint having a width which was only about 10% larger than the bore diameter of the output nozzle at a spray distance equal to 10–12 times the bore diameter of the output nozzle. This translated in a target efficiency of about 90% compared to 40–50% which is known as best achievable with prior art apparatuses. In other further experiments, deposit efficiency as high as 97% was achieved for certain feedstock materials. Deposit efficiency is generally defined as the percentage of the feedstock material fed into the thermal spray apparatus that actually deposits on the sprayed part. The balance of feedstock receives insufficient heat or momentum, bounces off the spray target without adhering to it and is therefore lost from the spray process. A low deposit efficiency results in increased costs of the spraying process and may render the entire process non economical or non competitive.

Having described the embodiments of the invention, modifications will be evident to those skilled in the art without departing from the scope and spirit of the invention as defined in the following appended claims.

I claim:

1. A feedstock injector having a longitudinal axis, and comprising:

(a) a first plurality of channels each having an upstream end and a downstream end, the first plurality of channels extending from the upstream end to an intermediate region of the injector, the fist plurality of channels disposed symmetrically about the longitudinal axis of the injector and shaped at their inlet ends to receive a stream of gas and to split the stream into a fist plurality of streams, each first plurality of channels having an outer wall and an inner wall, the plurality of inner walls substantially defining a first core segment therebetween;

(b) a second plurality of channels each having an upstream end and a downstream end, the second plurality of channels extending from the intermediate region towards the downstream end of the injector, the second plurality of channels disposed symmetrically about the longitudinal axis and comprising at least two channels for each channel of the first plurality of channels, the upstream ends of the second plurality of channels connected to the downstream ends of the first plurality of channels and shaped to receive the streams of gas flowing through the first plurality of channels and to split the streams into a second plurality of streams, each channel of the second plurality of channels having an outer wall and an inner wall, the plurality of inner walls substantially defining a second core segment therebetween;

(c) a feedstock input passage opening at the downstream end of the second core segment and oriented to direct feedstock axially in the downstream direction.

2. A feedstock injector as defined in claim 1 wherein the second plurality of channels converge at a convergence angle towards a common region of convergence located on the longitudinal axis downstream of the outlets of the second plurality of channels.

3. A feedstock injector as defined in claim 2 wherein the convergence angle is between 5 and 30 degrees.

4. A feedstock injector as described in claim 1 wherein the inner walls of the first plurality of channels are parallel with the longitudinal axis of the injector.

5. A feedstock injector as described in claim 2 wherein the inner walls of the first plurality of channels are parallel with the longitudinal axis of the injector.

6. A feedstock injector as described in claim 3 wherein the inner walls of the first plurality of channels are parallel with the longitudinal axis of the injector.

7. A feedstock injector as described in claim 2 wherein the angles between the longitudinal axes of the first plurality of channels and the longitudinal axis of the injector are equal to or less than the convergence angle.

8. A feedstock injector as described in claim 3 wherein the angles between the longitudinal axes of the first plurality of channels and the longitudinal axis of the injector are equal to or less than the convergence angle.

9. A feedstock injector as described in claim 4 wherein the angles between the longitudinal axes of the first plurality of channels and the longitudinal axis of the injector are equal to or less than the convergence angle.

10. A feedstock injector as described in claim 5 wherein the angles between the longitudinal axes of the first plurality of channels and the longitudinal axis of the injector are equal to or less than the convergence angle.

11. A feedstock injector as described in claim 6 wherein the angles between the longitudinal axes of the first plurality of channels and the longitudinal axis of the injector are equal to or less than the convergence angle.

12. A feedstock injector as described in claim 1 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

13. A feedstock injector as described in claim 2 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

14. A feedstock injector as described in claim 3 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality lane parallel with the first plurality upstream plane.

15. A feedstock injector as described in claim 4 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

16. A feedstock injector as described in claim 4 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

17. A feedstock injector as described in claim 5 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

18. A feedstock injector as described in claim 6 wherein the upstream ends of the first plurality of channels are in coplanar alignment in a first plurality upstream plane perpendicular to the longitudinal axis of the injector and wherein the upstream ends of the second plurality of channels in coplanar alignment in a second plurality plane parallel with the first plurality upstream plane.

19. A feedstock injector as described in claim 7 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

20. A feedstock injector as described in claim 8 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

21. A feedstock injector as described in claim 9 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

22. A feedstock injector as described in claim 10 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

23. A feedstock injector as described in claim 11 wherein the upstream ends of the first plurality of channels are in coplanar alignment in a first plurality upstream plane perpendicular to the longitudinal axis of the injector and wherein the upstream ends of the second plurality of channels are in coplanar alignment in a second plurality plane parallel with the first plurality upstream plane.

* * * * *